US006934952B2

(12) United States Patent  
Sarkar et al.

(10) Patent No.: US 6,934,952 B2
(45) Date of Patent: Aug. 23, 2005

(54) METHOD AND APPARATUS FOR MANAGING MULTIPLE INSTANCES OF SERVER CODE ON A MACHINE

(75) Inventors: Soumitra Sarkar, Cary, NC (US); Daniel E. Poirier, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 744 days.

(21) Appl. No.: 09/828,756

(22) Filed: Apr. 9, 2001

(65) Prior Publication Data

US 2002/0147856 A1 Oct. 10, 2002

(51) Int. Cl.[7] ................................................ G06F 9/54
(52) U.S. Cl. ...................... 719/310; 719/315; 709/209
(58) Field of Search .............................. 719/310, 315, 719/313, 316; 709/208–211

(56) References Cited

U.S. PATENT DOCUMENTS

| 5,265,239 | A | * | 11/1993 | Ardolino ..................... 709/217 |
| 5,291,605 | A | * | 3/1994 | Takagi et al. ................. 710/48 |
| 5,297,262 | A | * | 3/1994 | Cox et al. ..................... 710/36 |
| 5,553,239 | A | * | 9/1996 | Heath et al. ................. 713/201 |
| 5,553,287 | A | * | 9/1996 | Bailey et al. ................ 709/201 |
| 5,898,834 | A | * | 4/1999 | Sharpe et al. ............... 709/201 |
| 6,047,289 | A | * | 4/2000 | Thorne et al. ................ 707/10 |
| 6,166,455 | A | * | 12/2000 | Li ................................ 307/43 |
| 6,182,286 | B1 | * | 1/2001 | Sigal et al. .................. 717/122 |
| 6,243,826 | B1 | * | 6/2001 | Quoc et al. ..................... 714/4 |
| 6,374,286 | B1 | * | 4/2002 | Gee et al. .................... 718/108 |
| 6,738,977 | B1 | * | 5/2004 | Berry et al. ................. 719/332 |
| 6,822,961 | B1 | * | 11/2004 | Constantinof et al. ... 370/395.2 |

FOREIGN PATENT DOCUMENTS

| JP | 01312647 A | * | 12/1989 | ........... G06F/12/00 |
| JP | 2002024048 A | * | 1/2002 | ........... G06F/11/16 |

OTHER PUBLICATIONS

Bagley, J.D. et al. "Sharing Data and Services in a Virtual Machine System." ACM. 1975.*

* cited by examiner

Primary Examiner—Lewis A. Bullock, Jr.
(74) Attorney, Agent, or Firm—Synnestvedt & Lechner LLP; Stephen Calogero

(57) ABSTRACT

When multiple copies of a software program reside on a single machine and need to cooperate with each other to coordinate certain aspects of their execution, an election process is conducted to elect one of the copies as a master or supervisor copy, with the non-elected copies becoming slave or subordinate copies. Since only one of the programs can succeed in being assigned the supervisor port number, the first program to have its socket assigned to the supervisor port number becomes the supervisor (e.g., the master) program; the other programs respond to the failure of their request by assuming the role of a subordinate (e.g., a slave) program.

15 Claims, 5 Drawing Sheets

METHOD AND APPARATUS FOR MANAGING MULTIPLE INSTANCES OF SERVER CODE ON A MACHINE

BACKGROUND OF THE INVENTION

1. Field of the Invention

This invention relates to the field of distributed execution of software programs and, more particularly, to a method and system for coordinating all aspects of cooperation between different copies of the same software program residing on a single machine.

2. Description of the Related Art

The use of networked computers has increased dramatically since the first affordable PC's were introduced in the early 1980's. In today's business world it is not unusual to find hundreds of computers interconnected in a Local Area Network (LAN) arrangement so that all employees of a business organization can communicate with each other, share file access, share peripherals such as printers, etc. Wide Area Networks (WAN's) increase the level of connectivity by interconnecting several LAN's (e.g., LAN's for two or more geographically diverse locations of the same company) together to form an even larger network.

In the prior art, there are various examples where multiple copies of a software program, running in a network with one copy of the program running on each node (machine) in the network, cooperate with each other to perform one or more tasks. For example, in the Open Shortest Path First (OSPF) routing protocol in the Internet, and in the computation of spanning trees in token ring bridges, each machine runs one copy of the software that performs the protocol. Coordinating the distributed (inter-machine) computation among the networks relative to these distributed protocols is a very complex operation. At the same time, more and more services are provided on networks, and usage of individual services is increasing rapidly due to the ease with which very large numbers of users can access them.

One common technique for increasing the number of users that can reliably and efficiently use a network service is to run multiple copies of the service on each machine, to better use the processing power of such a machine (e.g., one with multiple central processing units (CPUs)). While such arrangements invariably save time and money and increase efficiency, administration of the multiple copies, e.g., updating the configuration of the multiple copies of the software program or coordinating some aspect of their execution on the machine, e.g., "license counting" (keeping track of the collective use of some resources, e.g., the number of connections created to backend data sources, by all copies of the software program running on the machine at any given time to ensure compliance with license restrictions) can be a complex task.

In the prior art, where multiple machines in a network, each machine running a single copy of a program, perform some cooperative task, coordination of these tasks is typically performed by "electing" a supervisor machine such that the software copy on the elected machine operates to perform the coordination, i.e., the software copy on the supervisor machine is the supervisor of the identical software programs. The supervisor has a master-slave relationship with the copies of the program running on the other machines, and coordinates the cooperation among the copies. FIG. 1 illustrates a simple example of such an arrangement.

Referring to FIG. 1, three machines, 101, 102, and 103, are interconnected via a network 100 in a typical arrangement. Each machine includes an identical copy (a clone) of a software program 104. In this example machine 102 has been designated as the supervisor machine and the software program 104 on machine 102 carries out the coordination of the cloned software programs.

Each of the machines 101, 102, and 103 has a unique identifier of some kind, typically an Internet Protocol (IP) address. This makes the basis of the coordination function of the supervisor relatively simple; to obtain task-specific information regarding the software 104 on a particular machine, the supervisor connects to the particular machine using the unique identifier and communicates with the software 104 residing thereon.

In this scenario, supervisor election typically occurs using a network level broadcast mechanism. Each copy of program 104 announces on the network its intention to become the supervisor. Some tie-breaking mechanism (e.g., the "smallest IP address wins") is used to elect the supervisor. Once the supervisor is elected using this process, each subordinate creates a connection to the supervisor. Each subordinate uses the connection to the supervisor to perform the coordination function it is designed for. The supervisor and the subordinates also constantly perform "heartbeat/keep alive" protocols over the network. This allows all the subordinates to detect if/when the supervisor terminates (normally or abnormally), in which case the reelection process over the network is repeated.

It is now becoming common to use multiple copies of the same software program on a single machine. For example, in a Web application server that provides a server-side Java-based execution environment for dynamic Web page generation, e.g., Java Server Pages (JSP) technology, the server might allow multiple Java Virtual Machines (JVMs) to be run on a single machine, to allow better CPU utilization of a multiprocessor machine, and to provide better fault tolerance in the event of a crash of a single JVM. In such a configuration, multiple copies of the same program (application) could be running on each JVM machine, and while each copy of the program performs its "main task" on an individual basis (i.e., each copy of the program running on the JVM example above could access a database to generate Web pages dynamically, in response to a browser request), these programs might need to occasionally cooperate with each other to perform various tasks such as the maintenance of a registry of available copies of the program on a machine, for administration purposes; or the computation of resource usage (e.g., computing the number of connections being used) by all the copies of the program on a particular machine.

IBM's WebSphere is an Internet software platform developed by IBM which, among other things, allows the running of multiple JVM's in a single machine. WebSphere includes a special "supervisor" program called the WS Admin Server which administers the JVM's, allowing them to be started and stopped. WebSphere includes an "admin repository" which is a relational database that could reside on any node. The admin repository contains all of the configuration information for the JVM's, including a list of the JVM's residing on the machine.

The WebSphere Admin Server (supervisor) runs as a separate operating system process and, it is the understanding of the applicant that no TCP connections are involved between the Admin Server process and the JVM's. Thus, WebSphere has a specialized supervisor program; the WebSphere supervisor only allows administration operations, i.e., start/stop, and does not allow a coordination function;

the admin repository, where the list of the JVM's resides, is not in the supervisor process; if the WS Admin Server terminates, no additional administration is possible; and there are no TCP connections between subordinates (JVM's) and supervisor (WS Admin Server).

WebSphere also includes a special purpose plug-in which operates to obtain requests from the web server and pass the requests to one of the JVM clones (which are identical in that they can handle identical requests). The plug-in performs this forwarding function by using a private protocol. In passing requests from the Web server to the JVM clones, the plug-in sometimes utilizes TCP/IP connections between the plug-in and the JVM's. However, the plug-in performs no supervisory or administrative functions with respect to the JVM's, and if the plug-in terminates, no special action is taken by the JVM's to identify a new plug-in to establish the connection.

It would be desirable to have a method and system for enabling the coordination of multiple copies of a software program residing on a single machine which solves the problems identified above.

SUMMARY OF THE INVENTION

In accordance with the present invention, when multiple copies of a software program reside on a single machine and need to cooperate with each other to coordinate certain aspects of their execution, an election process is conducted to elect one of the copies as a master or supervisor copy, with the non-elected copies becoming slave or subordinate copies. In a preferred embodiment the election process depends on the presence of a TCP/IP protocol stack on the machine, and depends on its capability to enforce the restriction that only one copy of the program (an operating system process) can create a binding between a TCP socket (a standard TCP/IP programming abstraction) and a given TCP port number. In this preferred embodiment, each program creates the TCP socket, and requests the TCP/IP stack to bind the socket to the same configured port number, referred to herein as the "supervisor port number". Since only one of the programs can succeed in being assigned the supervisor port number, the first program to have its socket assigned to the supervisor port number becomes the supervisor (e.g., the master) program; the other programs respond to the failure of their request by assuming the role of a subordinate (e.g., a slave) program.

Once the supervisor has been elected, each subordinate program creates an intra-machine TCP connection to the supervisor. These connections logically represent the master-slave hierarchy between the programs, and are also used to perform any proprietary protocol necessary for these programs to cooperate with each other. In addition, however, the intra-machine TCP connections also perform the efficient detection of supervisor failure by the subordinate programs so that they may initiate a re-election when necessary. To facilitate this function, each copy of the program, both the supervisor and the subordinates, use a standard socket programming API call that blocks its execution until it receives some data from the partner, at its end of the master-slave connection. Once the program associated with one end of the connection fails, the event is detected by the TCP/IP stack which immediately informs the program associated with the other end of the connection that the connection has been terminated, by unblocking its API call.

DETAILED DESCRIPTION OF THE PREFERRED EMBODIMENTS

Figure 1:
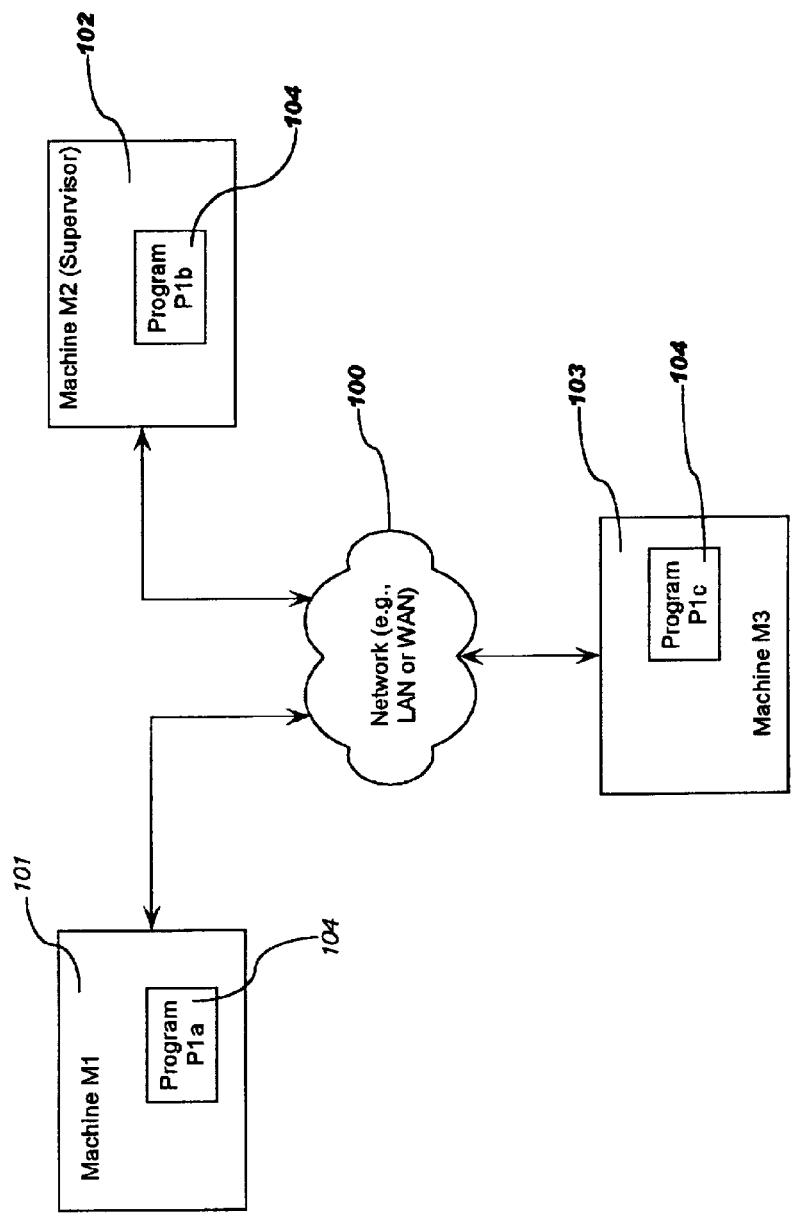
FIG. 1 is a block diagram illustrating a prior art configuration in which multiple machines each run a copy of an identical software program.
Figure 2:
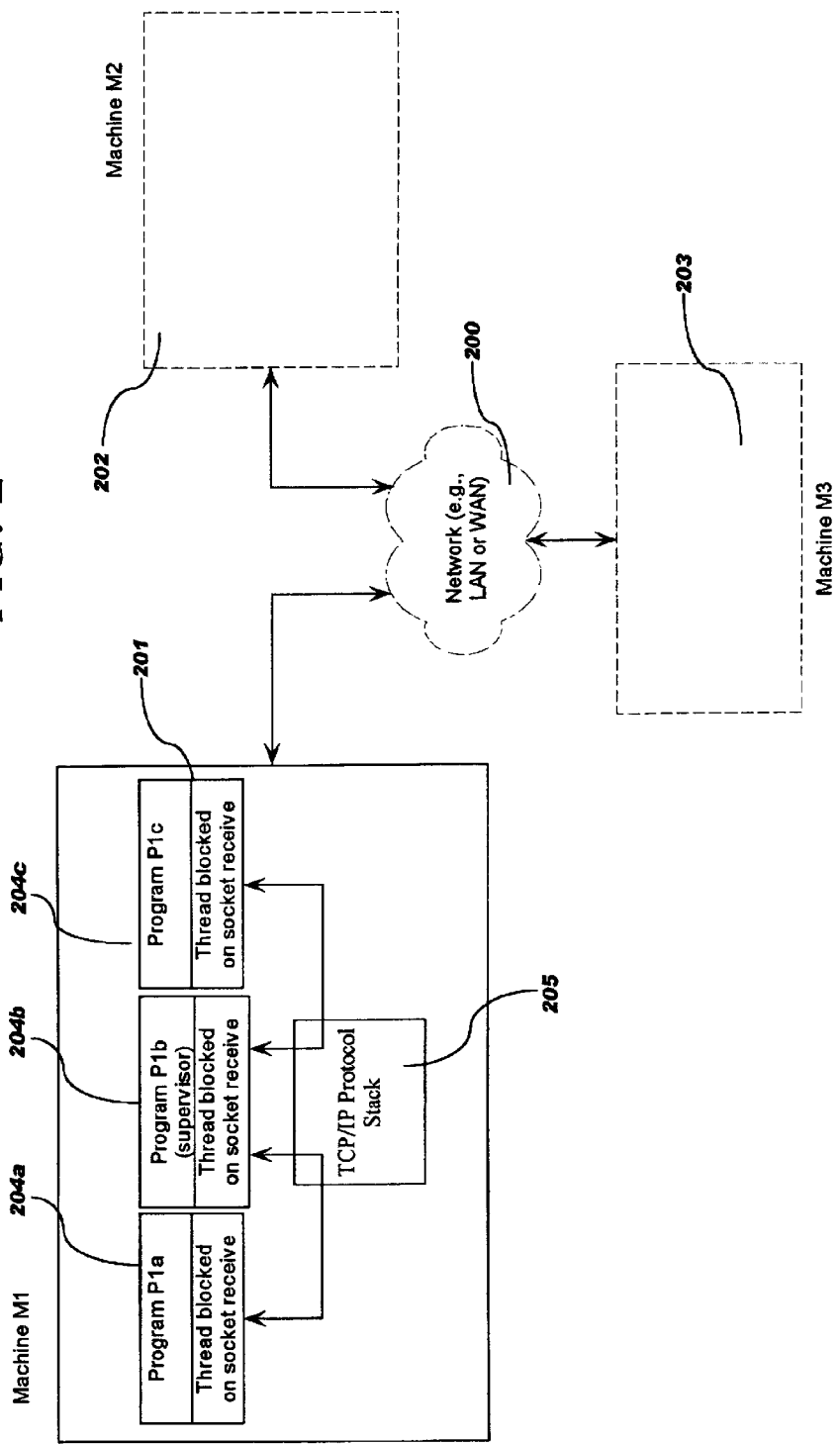
FIG. 2 is a block diagram of a network arrangement in accordance with the present invention.

FIG. 2 is a block diagram of a network arrangement similar to that shown in FIG. 1, but including a server machine 201 containing multiple (identical) copies of a program in accordance with the present invention. Shown in phantom lines are additional server machines 202 and 203 interconnected via a network 200. Discussion of these elements is unnecessary for understanding the present invention; they are shown only to provide a context for the present invention as compared to the prior art illustrated in FIG. 1.

Three identical software programs 204a, 204b, and 204c reside on the same machine, server machine 201. To enable cooperative processing between the software programs, in accordance with the present invention, the TC/IP Protocol Stack 205 of machine 201 is utilized, and it is used to elect one of the instances of the software program residing on server machine 201 as a supervisor. In FIG. 2, software program 204b is shown as having been elected as the supervisor.

The TCP/IP stack 205 manages all TCP/IP networking on a machine in a well known manner. Software programs (such as programs 204a, 204b, and 204c) that wish to communicate with each other using TCP/IP will use the services of the stack to create "sockets" (connection end points) and connect them to other programs' sockets. For the TCP stack to enforce the restriction that only one program can bind a TCP socket to the port number, it is necessary either that the programs do not bind the socket to any specific IP address, or that they all bind the socket to the same IP address. If a program wishes other programs to be able to connect to one of its sockets, the program must request the TCP/IP stack to bind a known port number to its socket, giving it an identity in addition to the IP address of the machine, so that the other programs can connect to its socket. In general, only one socket on a machine can be bound to a particular port number at a time, and for those systems which support multiple bindings (e.g., S/390), this feature must be turned off.

On machine 201, in accordance with the present invention, the three copies of the program 204a, 204b, and 204c use the TCP/IP stack as part of the process for selecting a supervisor in the following way: each program creates a TCP socket, and requests the TCP/IP stack to bind the socket to a configured port number, referred to herein as the "supervisor port number". Since only one of the programs can succeed in being assigned the supervisor port number, the first program to have its socket bound to the supervisor port number becomes the supervisor (e.g., the master) program; the other programs respond to the failure of their request by assuming the role of a subordinate (e.g., a slave) program.

Before the election process can be started, each copy of the program assigns itself a unique name. This can be accomplished in several fashions. For example, the mechanism used to start each copy of the program on the machine could assign a parameter to each program defining its unique name. In another example, when the program is started, it can create a unique name for itself, by basing at least part of the unique name on the TCP port that has been randomly assigned to a socket by the TCP/IP stack (a standard API exists to do this), since the TPC/IP stack enforces the uniqueness of such bound ports on a machine. The assignment of this unique name is required in any practical implementation of a master-slave model of coordination, since the supervisor and the subordinates need them to track each other.

Another problem addressed by the present invention is ensuring that the coordination function continues even if the elected supervisor program fails. The TCP/IP stack is again used to accomplish this task. As described above, each subordinate program establishes a TCP connection to the supervisor program. It is a property of connections between two programs using the same TCP/IP stack that if one program fails, the other program is notified immediately that the connection has ended abnormally, if it is blocked on a read request on the socket that represents its TCP connection end point. This is not true of programs residing on different machines however, where an abnormal failure of a process that "owns" one connection end point on one machine does not guarantee that the process that owns the other connection end point will be immediately notified. This is why prior art systems use "heartbeat" flows in inter-machine scenarios to obtain connection information, and thus identify failures, by periodically checking the status of the connection partner. However, when the programs all reside on the same machine, since each of the subordinate programs has a TCP/IP connection to the supervisor program using a common TCP/IP stack, the subordinate programs discover immediately if the supervisor program fails, and execute the supervisor election procedure again to choose a new supervisor. This failure detection mechanism is optimally efficient because it does not require a constant flow of "heartbeat" queries over the master-slave connection.

Once the supervisor role has been established for one of the copies of the program, it can optionally set up a registry (or directory) which contains an entry for each program instance running on the machine (including the supervisor itself). Each registry entry is assigned a unique name in the registry, or key, based on the unique name identifying a given program instance, and the registry can also contain, for example, a "remote reference" that can be used to remotely invoke administrative functions on that program instance. The unique name is used to locate and identify the registry entry. The remote reference is an object that can be used to communicate with the relevant program instance. When the supervisor election process is complete, and each subordinate program creates the TCP connection to the supervisor, it first performs a private protocol to validate the supervisor, and allows the supervisor to validate it. It also learns from the supervisor how to communicate with the registry; in a perferred embodiment, this registry is a Java RMI registry, and the information obtained during the private protocol is the port number needed to communicate with the Java RMI registry. The subordinate then registers itself using this registry. Subsequently, it communicates its unique name to the supervisor over the TCP connection, to make the supervisor aware of its presence on the machine. The supervisor, of course, must also register itself to the registry. If the supervisor fails, and a new supervisor is elected during the reelection process, that supervisor then becomes the new owner of the registry, and the subordinates that remain register themselves to this new registry.

While not required for the above-described supervisor election and failure recovery technique, having a registry that contains one entry for each program running on a machine provides many useful benefits. For example, the registry provides "visibility" of the software programs to other programs external to the machine which might wish to communicate with these programs, e.g., for administration purposes. Further, having the registry reside within the supervisor process itself, as opposed to being a separate program or database, enables the management of the registry entries to be optimized. If the registry is external to the supervisor process, then if the supervisor process terminates abnormally, the registry entry may not be "cleaned up," i.e., removed from the registry (e.g., if there are no subordinate programs at all, then the failure or "death" of the supervisor will not be detected). Thus, having the registry reside within the supervisor process itself guarantees that the registry will be cleaned up upon abnormal termination of the supervisor program.

The operation of the present invention will now be described in connection with a specific example involving the IBM product called "Host Publisher". It is understood that the following discussion is not intended to limit the scope of the present invention to the example and that the present invention will function in any environment where multiple instances of a software program reside on the same machine.

IBM's "Host Publisher" is a solution specifically designed for building Web and Enterprise applications that extracts information from legacy terminal-oriented applications based on 3270, 5250, and VT data streams, as well as relational databases. For terminal-oriented applications, Host Publisher provides tools for building Java objects (Java beans) that can extract information from those applications without modifying the applications themselves. For relational databases, Java beans that execute SQL queries can be generated. These Java beans can be used as building blocks of complex Web and Enterprise JavaBeans™-based applications. For example, there could be a 3270 application for accessing employee records, which has been accessed in the past from a "dumb terminal", by a user who is familiar with the host application's user interface. Using Host Publisher, the same application can be programmatically navigated through its various screens by a Host Publisher Java bean and the information from various screens can be extracted and stored in bean properties that can be used to generate a Web page dynamically. The Web page can then be presented to a browser user who is not familiar with the 3270 application's user interface. This enables legacy application rejuvenation, and allows the investment in these existing applications to be exploited for competitive advantage.

Host Publisher comprises two main components, Host Publisher Server ("HP Server") and Host Publisher Studio ("HP Studio"). The HP Studio is used to build application building blocks, called integration objects (IO's), which are Java beans that encapsulate a unit of interaction with a terminal-oriented application or a relational database. For terminal-oriented applications, the HP Server uses the services of Host-On-Demand (HOD), which provides the capability for running macros that contain the instructions to programmatically navigate an application based on 3270, 5250 or VT data stream. The HP Server, along with a Web Application Server, provides the runtime environment (RTE) for executing IO's.

The HP Server code runs in a Java Virtual Machine (JVM) and provides an execution environment for host and database access Java beans created using the HP Studio. HP Server performs functions such as connection management for IOs, connection pooling, and Host Publisher application management. HP Server also allows the runtime to be administered by supporting queries that display various pooled connections and their states, providing the ability to display on the server the terminal user interface associated with a terminal-oriented application which is being driven by an IO, allowing the deletion of failed connections, and the like.

In early versions of Host Publisher, where only one JVM per machine would be running Host Publisher, administration of Host Publisher was Web-based. A Host Publisher administration servlet (HP Admin) provided an HTML-based administration user interface. The HP Admin servlet resided within each JVM. As an example, a URL request of the form http://myhost/HostPublisher/hpadmin/main.jsp would execute the HP Admin servlet, which in turn performed its administrative functions by making local calls to methods of Java objects that represented the state of the HP server (the connections it had created, the applications it was aware of, etc.) on that JVM.

Newer versions of HP run in an environment where there may be multiple JVMs on a machine, some of which could be clones of each other. In other words, they will run the same set of applications, and would respond to the same URL alias (e.g., HostPublisher in the example above). A load balancing mechanism, which is part of the Web application server, performs the load balancing function to distribute requests across JVM clones, any of which can handle a given request. The JVM clones can reside inside one machine (vertical cloning), or across machines (horizontal cloning).

With cloned JVMs and multiple copies of HP Server running on a single machine, the traditional HP administration model will not function. A URL request of the form http://myhost/HostPublisher/hpadmin/main.jsp may not reach the correct JVM (i.e., the correct HP administration servlet instance) one wants to administer. Since each of the cloned JVMs can respond to the same request, the load balancing mechanism could send the request to any JVM on that machine. For example, if, on a single machine, four cloned JVMs, JVM1, JVM2, JVM3, and JVM4, exist, and the URL for the administration servlet for the cloned JVMs is entered, it might go to JVM3, or it might go to JVM1.

To solve this problem, in accordance with the present invention, the solution does not depend on HTTP protocols to address a given Host Publisher RTE instance for administration purposes, via an administrative servlet running on the same JVM. Instead, in accordance with the present invention, each Host Publisher RTE, when initialized, creates an HP Admin server component, which is accessible remotely using Java's Remote Method Invocation (RMI) feature. A corresponding HP Admin client component can communicate with this server to access information about that RTE's state using RMI calls. Each HP Admin server instance running in a JVM is uniquely identifiable via its name which is unique within a machine. An RMI registry, managed by one of the Host Publisher instances on the machine (the supervisor) contains entries for each Host Publisher instance on the machine, keyed by the instance's unique name. Remote administration clients can query the registry to get the names of all the Host Publisher instances currently active on a machine, and for each, a reference to an RMI object that can be used to communicate with the administration server code running on that Host Publisher instance.

Figure 3:
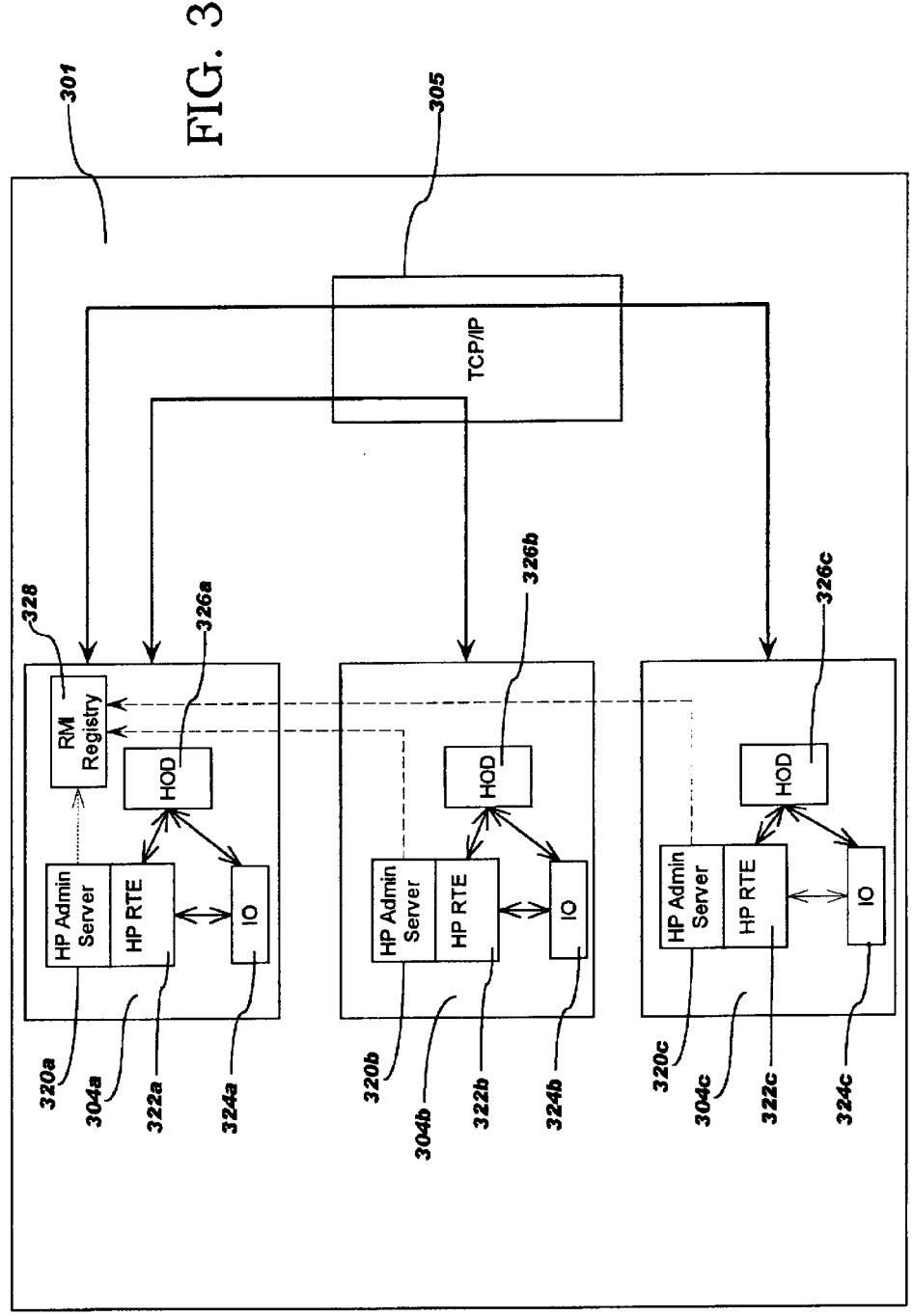
FIG. 3 illustrates an example of a configuration in accordance with the present invention in which multiple JVM's reside within a single machine.

FIG. 3 illustrates the details of a configuration in which multiple JVMs 304a, 304b, and 304c reside within a single machine or node 301. In the example of FIG. 3, each JVM contains the HP RTE classes and objects (322a, 322b, and 322c) when started, and also a separate instance of the Host On Demand (HOD) classes and objects (326a, 326b, and 326c) needed to interact with terminal-oriented host applications. The RTE classes and objects contain logic to represent and implement host and database connections, connection pools and their management, Host Publisher application components, such as configuration descriptions, administration functions, etc. The HOD classes and objects are used to create connections to terminal-oriented applications, to implement the application protocols necessary to communicate with them, and to provide programmatic access to these functions. Each RTE 322a, 322b, and 322c includes an HP Admin server object (320a, 320b, and 320c), which in this example is an RMI object capable of receiving remote method calls over Java Remote Method Protocol (JRMP). Each Host Publisher RTE 322a, 322b, and 322c also includes the code for an HP Admin servlet which can act as an administration client that can use RMI calls to talk to any instance of the HP Admin server running on a machine and JVM to administer it. This is simply a packaging decision of how to ship the code. The HP Admin servlet can be run anywhere suitable to the user, on any machine which has Host Publisher installed. Each Host Publisher RTE on a machine uses the same application configuration files. The files are read in, and internal Java objects that represent application configuration and HOD macros are created.

Figure 4:
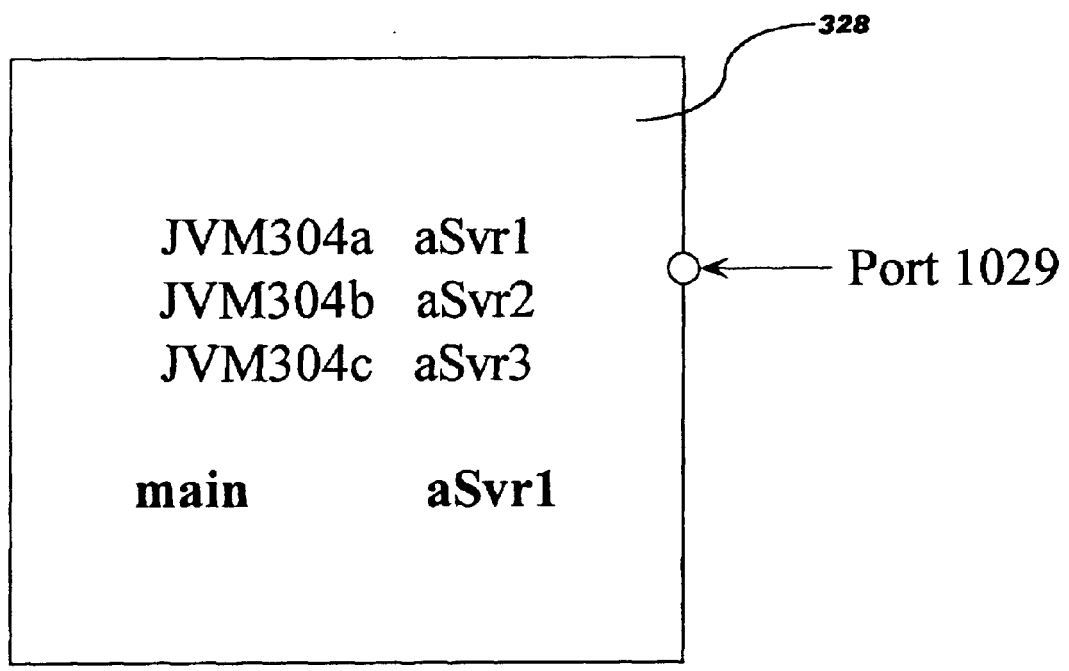
FIG. 4 is a detail drawing of RMI registry 328 of FIG. 3.

FIG. 4 provides more detail regarding RMI Registry 328 of FIG. 3. As shown in FIG. 4, the RMI registry 328 contains registration information for each of the JVMs 304a, 304b, and 304c. The designation "main" identifies aSvr1 (corresponding to JVM304a) as the "distinguished RTE" as explained in more detail below.

Each line in the RMI registry represents an entry for a Host Publisher RTE instance. The entry consists of two items, the first being the unique name of a Host Publisher RTE instance on the machine (e.g., JVM304a) and the second being a reference to the RMI object that can be used by the HP Admin servlet-based administration client to remotely invoke the HP Admin server's administration methods (functions) for that Host Publisher RTE instance. The RMI registry code uses TCP connections to communicate with clients that want to query it, and any software that uses TCP connections needs to use a TCP port to "listen" for connection requests from other programs. In FIG. 4, TCP port number 1029 fulfills this need.

Referring to FIGS. 3 and 4, the first HP RTE to be initialized in a machine creates a TCP socket and binds it to a pre-configured port (30099 is the default, but this can be changed on a machine where Host Publisher is installed by modifying a shared configuration file), and if it succeeds, it creates an RMI registry on a random port (this can be any port number; for purpose of example we refer to port 1029 in FIG. 4) which runs on the same JVM. This first RTE becomes the "distinguished RTE" (DRTE), which designates it as the supervisor. In the example illustrated with respect to FIGS. 3 and 4, the DRTE is JVM 304a. Non-DRTEs, i.e., those RTEs that cannot create the TCP socket on the pre-configured port (30099) during initialization because of the port conflict created by the first RTE, become the subordinate RTEs. Each subordinate RTE sets up a TCP connection to the DRTE, uses a proprietary protocol to inform the RTE about its machine-unique name, learns from the DRTE the random port number on which it has started the JVM-coresident RMI registry, and registers to the registry its RMI server object which is the front end for the HP Admin server function of that RTE. The DRTE also does this, but since it "owns" the RMI registry, it does not have to set up a TCP connection to itself and perform the proprietary protocol. The DRTE also creates a special entry in the RMI registry for itself, called "main" indicating (in FIG. 3) that aSvr1 is the remote reference of the RMI object for the DRTE, enabling administration clients to talk to the DRTE if they wish to, without having to know its name. In the illustrated example the subordinate RTEs are JVMs 304*b* and 304*c*, called JVM304*b* and JVM304*c*, respectively.

The DRTE retains its supervisor role until the JVM it is running in is shut down. At that point, the RMI registry running on the JVM (e.g., RMI registry 328) is also automatically destroyed. Each non-DRTE is immediately informed about the DRTE shutdown because of its local (intra-machine) TCP connection to the DRTE, and the fact that it has code that has blocked on a socket "receive" call. Each non-DRTE (e.g., JVMs 304*b* and 304*c*) can then compete to become the next DRTE by trying to create a TCP socket and bind it to the pre-configured port (30099 default). As before, only one will succeed, and thus become the new DRTE. The new DRTE will create a new RMI registry on a random port, and the new non-DRTE's will set up a TCP connection to it, and perform the proprietary protocol to ultimately register themselves to this new RMI registry.

The scope of these operations (RMI registry creation, DRTE election, etc.) is a single machine. In various multi-machine configurations using a load balancing mechanism to build a server cluster (e.g., IBM's Network Dispatcher, or IBM's Websphere Workload Management function), these operations are repeated in each machine in the cluster which starts one or more JVMs configured to run Host Publisher. To administer an RTE instance, the administrator first selects a machine. That selection is used by the HP Admin client (the servlet) to first communicate with the DRTE on that machine on the pre-configured port (30099 by default), perform a proprietary protocol to get the random port number of the RMI registry running on the DRTE's JVM, and then access the RMI registry to get the list of RTEs running on that machine. This list is presented to the administrator, who selects an RTE to administer (remotely), and only then are the RMI-based mechanisms utilized to administer the RTE instance selected.

When a specific HP RTE instance is chosen by the administrator (the naming issue is discussed below), the RMI registry on that machine is once again queried to get a "remote reference" to the RMI object that is used by the administration client to remotely invoke administration functions of that RTE's Admin server. A well-defined proprietary administration interface is implemented by that RMI object, and appropriate remote API calls are made by the HP Admin servlet (the Admin client) to respond to the administrator's (HTTP) requests to manage the RTE instance.

The key to making each HP RTE instance in a machine uniquely (and reliably) addressable is to give it a name that can be uniquely associated with the JVM that is created by the Websphere server on that machine. In the Host Publisher implementation, each HP Admin server running in a Websphere-created JVM makes an internal Websphere-supplied API call to retrieve information unique to that JVM, which is then subsequently used in the creation of that RTE instance name which will ultimately be registered to the RMI registry created by the DRTE.

Figure 5:
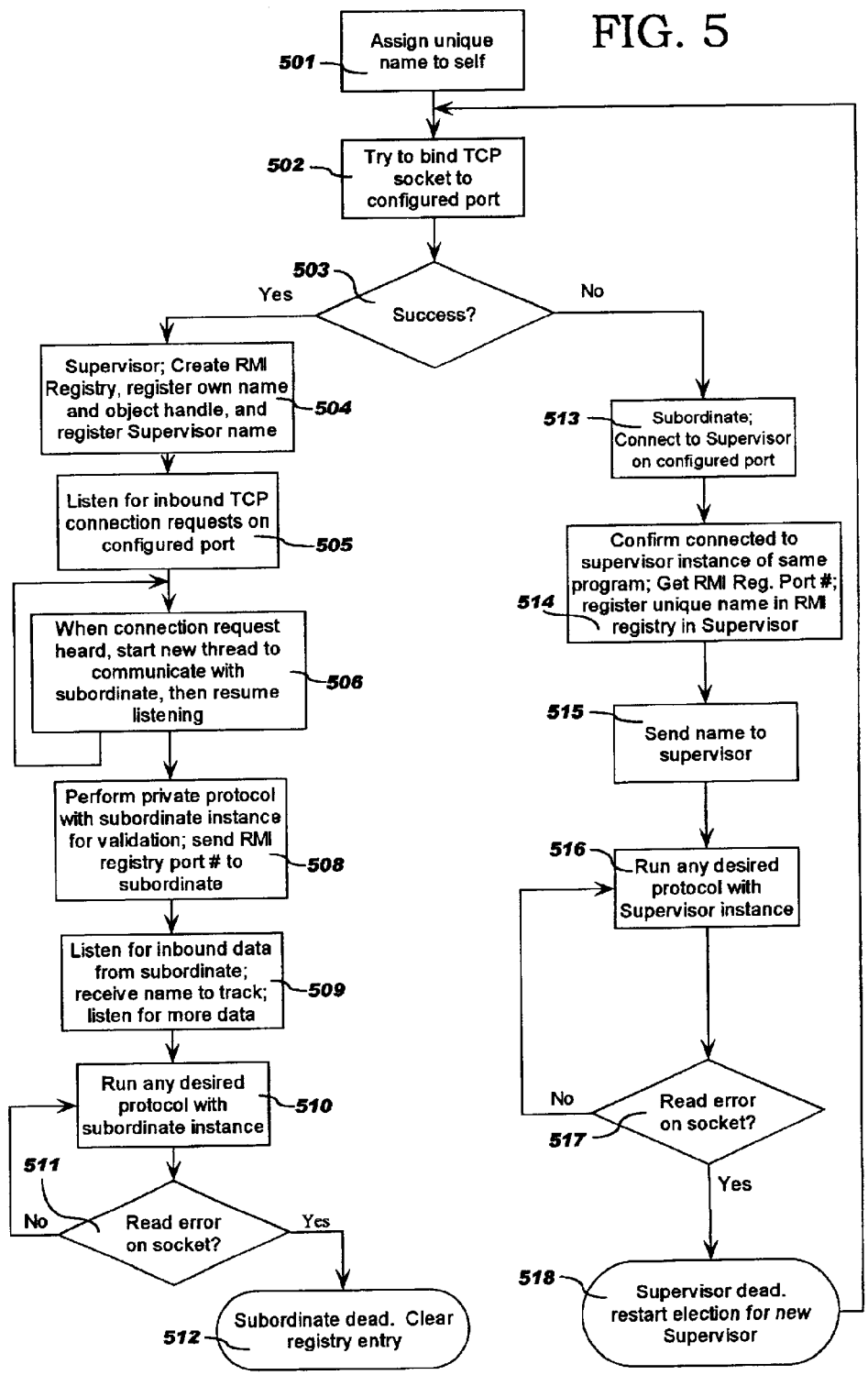
FIG. 5 is a flowchart illustrating an example of steps performed to elect a supervisor and perform fault detection in accordance with the present invention.

FIG. 5 is a flowchart illustrating an example of the steps performed to elect the supervisor and perform fault detection in accordance with the present invention. At step 501, a unique name is assigned to each JVM as described above so that it can be identified by the JVM that is eventually elected as the supervisor.

At step 502, each JVM attempts to bind a TCP socket to the configured port. The port to be used is configured in a particular file. For Host Publisher, each instance knows the location of this file relative to the directory to where it is installed. The directory where it is installed is passed to each Host Publisher instance when it is started. The first JVM to bind a TCP socket to this port number becomes the supervisor (step 504); the unsuccessful JVMs become subordinates to the supervisor (step 513).

At Step 505, the supervisor JVM listens for an inbound TCP connection request on the configured port. These TCP connection requests will come from the subordinate JVMs, which send a TCP connection request to the supervisor. This TCP connection is used by each subordinate to inform the supervisor about its existence and its name, and to learn the port number of the RMI registry that the supervisor has created so that it can register itself in that registry. Further, the TCP connection is used by each subordinate to flow private protocol-specific data, e.g., in Host Publisher's case, to allow the master to compute the license usage in the machine by accumulating the usage counts in all Host Publisher instances for both the supervisor and the subordinate. As the license usage goes up and down in each subordinate, it informs the supervisor about the change, and the supervisor keeps the tally of license usage across all HP Server instances in the machine (including itself). In addition, the connection allows the subordinates to detect when the supervisor has died, without requiring any heartbeat/keep-alive flows, as described above, so that they can perform the election process again to select a new supervisor. Finally, this TCP connection allows the supervisor to detect when a subordinate has died without any heartbeat/keep-alive flows, so that the supervisor can remove the RMI registry entry corresponding to that subordinate.

At Step 506, when a connection request is received from a subordinate, the supervisor creates a separate thread of control to deal with that subordinate for the rest of the subordinate program's lifetime. This thread performs all exchanges of data with that subordinate to participate in the private protocol that is used to coordinate various aspects of the execution of the program instances (e.g., machine-wide license counting) and failure detection of the subordinate (by the supervisor) and the supervisor (by the subordinate). Once this subordinate-specific thread has been created, the supervisor returns to a listening mode to listen for more inbound TCP connection requests from other subordinates.

At Step 508 the supervisor's dedicated thread performs a private protocol with the particular subordinate to which the TCP connection has been created. The protocol begins with the supervisor receiving a request from the subordinate to get the RMI registry port number, to which it responds by sending the RMI registry port number to the subordinate. This exchange also allows the supervisor and the subordinate to validate each other, since specific data formats have to be understood by both sides for the above exchange to succeed. At Step 509 the supervisor receives the name of the subordinate, which it saves for internal tracking purposes. The supervisor continues to listen for more incoming data, and will send data to the subordinate also, as part of the private protocol they perform to coordinate different aspects of their execution.

At Step 510, the supervisor runs any desired protocol with the subordinate to which it has set up a TCP connection. At Step 511, the supervisor's READ call unblocks and a determination is made as to whether or not a READ error was received on the socket that the supervisor is using to communicate with the subordinate over the TCP connection between them. If no READ error is received, this is an indication that the subordinate has sent data related to the private protocol. The supervisor may send data back in response, and the process reverts back to step 510 to listen for more data from the subordinate. If a READ error is detected, this is an indication that the subordinate is non-functional, and the RMI registry entry for that subordinate is removed from the registry by the supervisor.

Once a program becomes a subordinate by virtue of its inability to bind a TCP socket to the configured port at Steps 502 and 503, at Step 513 the subordinate connects to the supervisor on the configured port. At Step 514, the subordinate performs the first part of a private protocol with the supervisor by requesting the RMI registry port number. The response is used to verify that the configured port is indeed being used by the supervisor and not by some other program accidentally using that TCP port; if the response is not valid according to the private protocol, the subordinate disconnects. Once this is confirmed, the RMI Registry port # is retrieved from the supervisor, and the subordinate registers its own unique name (the unique name created in step 501) in the RMI Registry created by the supervisor, and then informs the supervisor about its own unique name (step 515).

At Step 515, the subordinate sends its name to the supervisor. At Step 516, any desired protocols for coordinating the execution of the various copies of the program, such as license counting, are run with the supervisor. At Step 517, a determination is made as to whether or not a READ error has occurred on the subordinate-side socket, when the subordinate's READ call to get the next piece of private protocol-related data from the supervisor unblocks. If no READ error has occurred on the socket, this indicates that the supervisor is functioning properly. Optionally, the subordinate may send data back to the supervisor in response if the private protocol requires it. If, on the other hand, a READ error is detected at step 517, this indicates that the supervisor is non-functioning (Step 518) and the process reverts back to Step 502 to begin the election process anew.

By using the present invention, simple administration and coordination of multiple copies of the same program on a single machine, and also facilitates quick and efficient handling of situations in which any of the programs fail. If the supervisor program fails, all of the remaining subordinate programs immediately begin the election of a new supervisor; if one of the subordinate programs fails, the supervisor immediately removes the failed subordinate program from the registry so that failed attempts to communicate with the failed subordinate program do not occur.

The preferred embodiment therefore addresses the problems of supervisor election and failure detection in an optimally efficient way, when multiple copies of a program execute within the context of a single machine. The election protocol requires no network-style broadcast flows, but depends instead on a basic (and universal) feature of all TCP/IP stacks that allow only one socket (in any process) to bind to a given port number. The supervisor failure detection does not require any heartbeat flows between the supervisor and the subordinate, since it depends on the TCP/IP stack, which manages both the master and subordinate endpoints of each master-slave connection, to detect the failure of a master or a subordinate program. This is a key advantage of the present invention, enabling both the election protocol and supervisor failure protocol detection to occur without generating any network traffic.

Although the present invention has been described with respect to a specific preferred embodiment thereof, various changes and modifications may be suggested to one skilled in the art and it is intended that the present invention encompass such changes and modifications as fall within the scope of the appended claims.

We claim:

1. A method for coordinating multiple instances of the same software program residing on a single machine comprising a TCP/IP stack, comprising:

automatically electing one of said software instances as a supervisor program, thereby designating the remainder of said software instances as subordinate programs;

establishing communication connections between said supervisor program and each of said subordinate programs; and coordinating all of said software instances by having said supervisor program monitor and control all operations of said subordinate programs which require coordination via said communication connections;

wherein automatically electing one of said software instances as a supervisor program comprises:

having each software instance establish a TCP socket;

having each software instance attempt to create a binding between its TCP socket and a supervisor port number of said TCP/IP stack; and designating the software instance which succeeds in creating said binding as said supervisor program.

2. The method as set forth in claim 1 wherein coordinating all of said software instances by having said supervisor program monitor and control all operations of said subordinate programs which require coordination via said communication connections comprises detection of failure of any of said software instances, and wherein:

establishing communication connections between said supervisor program and each of said subordinate programs comprises having each of said subordinate programs establish a TCP connection to the supervisor program; and said detection of failure of any of said software instances comprises having said TCP/IP stack monitor all of said TCP connections, wherein if one of said subordinate programs fails, the supervisor is notified of the failure via the TCP connection established between said one of said subordinate programs and said supervisor program.

3. The method as set forth in claim 1 wherein coordinating all of said software instances by having said supervisor program monitor and control all operations of said subordinate programs which require coordination via said communication connections comprises detection of failure of any of said software instances, and wherein:

establishing communication connections between said supervisor program and each of said subordinate programs comprises having each of said subordinate programs establish a TCP connection to the supervisor program; and detection of failure of any of said software instances comprises having said TCP/IP stack monitor all of said TCP connections, wherein if said supervisor programs fails, each of said subordinate programs is notified of the failure via the TCP connection established between said one of said subordinate programs and said supervisor program.

4. The method as set forth in claim 3, wherein if each of said subordinate programs is notified of the failure of said supervisor program, said subordinate programs so notified immediately repeat automatically electing one of said software instances as a supervisor program to elect a new supervisor program and designate a new set of subordinate programs.

5. The method as set forth in claim 1, further comprising creating a registry, within the supervisor program, containing a unique entry for each software instance residing on said machine.

6. A computer readable program product for coordinating multiple instances of the same software program residing on a single machine comprising a TCP/IP stack, said computer program product comprising:

a computer readable storage medium having computer readable code embodied in said medium, said computer readable code comprising:

computer instructions for automatically electing one of said software instances as a supervisor program, thereby designating the remainder of said software instances as subordinate programs;

computer instructions for establishing communication connections between said supervisor program and each of said subordinate programs; and computer instructions for coordinating all of said software instances by having said supervisor program monitor and control all operations of said subordinate programs which require coordination via said communication connections;

wherein said computer instructions for electing one of said software instances as a supervisor program comprises:

computer instructions causing each software instance to establish a TCP socket;

computer instructions causing each software instance to attempt to create a binding between its TCP socket and a supervisor port number of said TCP/IP stack; and computer instructions for designating the software instance which succeeds in creating said binding as said supervisor program.

7. The computer readable program product as set forth in claim 6, wherein said computer instructions for coordinating all of said software instances by having said supervisor program monitor and control all operations of said subordinate programs which require coordination via said communication connections comprises computer instructions for detection of failure of any of said software instances, and wherein:

said computer instructions for establishing communication connections comprises at least computer instructions causing each of said subordinate programs to establish a TCP connection to the supervisor program; and said computer program product comprises computer instructions for causing said TCP/IP stack to monitor all of said TCP connections, wherein if one of said subordinate programs fails, the supervisor is notified of the failure via the TCP connection established between said one of said subordinate programs and said supervisor program.

8. The computer readable program product as set forth in claim 6 wherein said computer instructions for coordinating all of said software instances by having said supervisor program monitor and control all operations of said subordinate programs which require coordination via said communication connections comprises computer instructions for detection of failure of any of said software instances, and wherein:

said computer instructions for establishing communication connections comprises at least computer instructions causing each of said subordinate programs to establish a TCP connection to the supervisor program; and said computer program product comprises computer instructions for causing said TCP/IP stack to monitor all of said TCP connections, wherein if said supervisor programs fails, each of said subordinate programs is notified of the failure via the TCP connection established between said one of said subordinate programs and said supervisor program.

9. The computer readable program product as set forth in claim 8, wherein said computer program product comprises computer instructions which, if each of said subordinate programs is notified of the failure of said supervisor program, causes said subordinate programs so notified to immediately repeat said computer instructions for automatically electing one of said software instances as a supervisor program to elect a new supervisor program and designate a new set of subordinate programs.

10. The computer readable program product as set forth in claim 6, further comprising computer instructions causing the creation of a registry, within the supervisor program, containing a unique entry for each software instance residing on said machine.

11. A system for coordinating multiple instances of the same software program residing on a single machine comprising a TCP/IP stack, comprising:

means for automatically electing one of said software instances as a supervisor program, thereby designating the remainder of said software instances as subordinate programs;

means for establishing communication connections between said supervisor program and each of said subordinate programs; and means for coordinating all of said software instances by having said supervisor program monitor and control all operations of said subordinate programs which require coordination via said communication connections;

wherein said means for electing comprises:

means for causing each software instance to establish a TCP socket;

means for causing each software instance to attempt to create a binding between its TCP socket and a supervisor port number of said TCP/IP stack; and means for causing the designation of the software instance which succeeds in creating said binding as said supervisor program.

12. The system as set forth in claim 11 wherein said means for coordinating comprises means for detection of failure of any of said software instances, and wherein:

said means for establishing communication connections comprises means for causing each of said subordinate programs to establish a TCP connection to the supervisor program; and said means for detection comprises means for causing said TCP/IP stack to monitor all of said TCP connections, wherein if one of said subordinate programs fails, the supervisor is notified of the failure via the TCP connection established between said one of said subordinate programs and said supervisor program.

13. The system as set forth in claim 11 wherein said means for coordinating comprises means for detection of failure of any of said software instances, and wherein:

said means for establishing communication connections comprises means for causing each of said subordinate programs to establish a TCP connection to the supervisor program; and said means for detection comprises means for causing said TCP/IP stack to monitor all of said TCP connections, wherein if said supervisor programs fails, each of said subordinate programs is notified of the failure via the TCP connection established between said one of said subordinate programs and said supervisor program.

14. The system as set forth in claim 13, wherein if each of said subordinate programs is notified of the failure of said supervisor program, said subordinate programs so notified immediately repeat said means for automatically electing to elect a new supervisor program and designate a new set of subordinate programs.

15. The system as set forth in claim 11, further comprising means for creating a registry, within the supervisor program, containing a unique entry for each software instance residing on said machine.

* * * * *